Sept. 12, 1961 J. MARTIN 2,999,659
PARACHUTE APPARATUS
Filed Feb. 6, 1959 2 Sheets-Sheet 1

Inventor
JAMES MARTIN
By Kurt Kelmer
his AGENT

Sept. 12, 1961        J. MARTIN        2,999,659
PARACHUTE APPARATUS
Filed Feb. 6, 1959        2 Sheets-Sheet 2
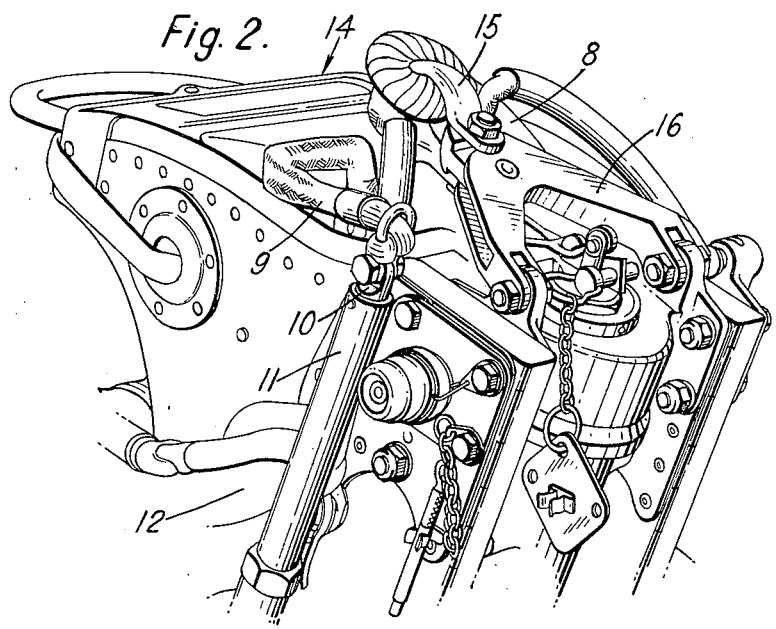
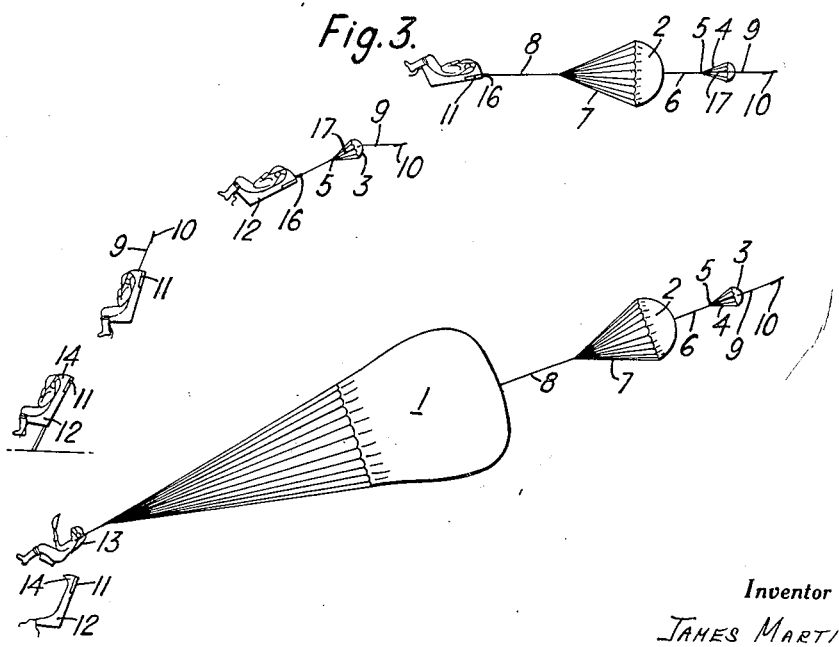
Inventor
JAMES MARTIN
By Kurt Kelman
his AGENT ര
2,999,659
PARACHUTE APPARATUS
James Martin, Southlands Manor, Southlands Road, Denham, near Uxbridge, England
Filed Feb. 6, 1959, Ser. No. 791,680
Claims priority, application Great Britain Feb. 10, 1958
5 Claims. (Cl. 244—141)

This invention concerns improvements in parachute apparatus of the kind in which two or more parachutes are connected together in series and are adapted to be deployed in succession, the deployment of any parachute of the series, except the first of the series, being influenced by the deployment of the preceding parachute in the series which acts as a drogue parachute for the immediately succeeding parachute, the first or pilot parachute of the series, hereinafter called the "controller parachute," being arranged for forcible projection by a deploying member into the air when its deployment is required to initiate the deployment of the succeeding parachute or parachutes of the series. The invention is also concerned with aircraft ejection seats furnished with parachute apparatus of the kind referred to.

In effecting the deployment of a series of parachutes such as above described, there are two objects which it is desired to achieve but which are of a somewhat conflicting character. The first of these objects is to deploy the parachutes as quickly as possible in order that they will commence to perform their respective functions as soon as possible, this being very important when the parachutes are to be deployed near to the ground and especially so when they include a parachute supporting a human being or carrying delicate equipment. The other or second of the said conflicting objects is to avoid opening the parachutes so rapidly or explosively as to cause the bursting of one or more of them.

The relative air speed at which a parachute may be deployed safely is, to a large extent, a function of the size of the parachute, the smaller the diameter of the parachute the higher the relative air speed at which it may be deployed safely. Generally speaking, the relative air speed at which a parachute may be deployed safely (i.e. without serious danger of bursting) may be increased by causing an elongation or squidding of the parachute in the initial stages of its deployment, this elongation or squidding being effected by exerting a pull on the crown of the parachute by a preceding parachute. Thus Patent No. 2,762,588 describes the use of a controller parachute for causing initial elongation or squidding of an immediately succeeding drogue parachute thereby temporarily to delay the full deployment of such parachute. In the said patent the use of the said parachute arrangement is described more particularly in connection with an aircraft ejection seat of the general character described in Patent No. 2,467,763, the said drogue parachute being connected to the ejection seat and also to an airman's or personal parachute and the arrangement being such that, after the ejection of the said seat from an aircraft, the controller parachute is first forcibly projected into the air stream and deployed for withdrawing the drogue parachute from its housing and causing such parachute initially to elongate or squid temporarily to retard or delay its full deployment, this drogue parachute thus serving progressively to bring the ejection seat into, or substantially into, the line of flight and then being released (for example, as described in Patent No. 2,708,083) from the ejection seat so that it then withdraws the personal parachute from its housing for deployment to separate the airman from the ejection seat and to sustain him during his descent. Moreover, in the arrangement described in the said Patent No. 2,762,588, after the launching of the ejection seat, the controller parachute is forcibly projected into the air stream by a deploying member in the form of a projectile or piston normally housed in a drogue gun carried by the ejection seat and from which the deploying member is automatically propelled by means of an explosive cartridge, the deploying member being connected to the crown of the controller parachute by a drawline.

The forcible projection of a controller parachute as above described causes this parachute to elongate or squid, thus retarding or delaying the deployment of the controller parachute, the elongation or squidding appearing to occur however carefully the mass of the deploying member and the velocity at which it is projected may be chosen. Delay in the full deployment of the controller parachute necessarily involves the risk of premature and uncontrolled deployment of the succeeding parachute or parachutes with the attendant risk of bursting the same consequent upon explosive opening; because of the ever increasing relative air speeds at which parachutes (and particularly those used in high speed aircraft for which use this invention is especially suitable) are required to be deployed, it is becoming more and more important that any such risks should be eliminated or reduced.

Therefore by this invention it is sought to avoid or reduce, in a series of parachutes of the character above referred to, the retardation, due to squidding, of the deployment of the controller parachute when forcibly projected into an air stream of relatively high speed such as is, for example, usually encountered when launching an ejection seat in an emergency from a modern aircraft.

According to this invention there is provided for use in parachute apparatus of the kind referred to, a controller parachute having the crown thereof securely connected by an anti-squid line, located within the parachute, to the connected ends of the shroud lines of such parachute or to a further line or part securely attached to such ends, a deploying member for forcibly projecting said controller parachute into the air and a drawline connected at one end to said deploying member and at the other end to the crown of the controller parachute in such manner that tension applied to the drawline of the said deploying member is transmitted to said anti-squid line.

By the term "anti-squid line" used herein is meant a line of such length and tensile strength as to permit the full deployment of the controller parachute but which prevents any substantial elongation or squidding of the latter, such line serving to relieve the canopy of the controller parachute of the tension applied by the said deploying member to the drawline of the controller parachute and to transmit such tension to the said connected ends of the shroud lines of the controller parachute or to said further line or part securely attached to such ends.

According to a further aspect of this invention there is provided parachute apparatus of the kind referred to, wherein the drawline of the deploying member for the controller parachute is securely attached to the crown of such parachute and to one end of an anti-squid line located within this parachute and having its other end secured to the connected ends of the shroud lines of the controller parachute, or to a further line or part securely attached to such ends.

The invention is particularly suitable for use in ejection seats for aircraft and employing parachute systems as described in the aforementioned Patent No. 2,762,588 and, according to a further aspect of the invention, there is provided an aircraft ejection seat of the kind adapted to be forcibly ejected by an ejection gun from an aircraft in an emergency, wherein is provided a series of interconnected parachutes comprising a personal parachute for the occupant of the ejection seat, a drogue parachute releasably connected by a drawline to the said ejection seat and also connected to the crown of said personal parachute, a controller parachute having its shroud lines connected by a further drawline to the crown of said drogue parachute, a deploying member connected by a drawline to the crown of said controller parachute for forcibly projecting such parachute into the air to deploy said controller parachute and by this parachute the said drogue parachute after ejection of the said seat from the aircraft, and a flexible anti-squid line extending within the said controller parachute from that end of the drawline of the said deploying member which is connected to the crown of the controller parachute to the connected ends of the shroud lines of such parachute and thereby to the further drawline connecting the controller parachute to the crown of said drogue parachute.

Further features of the invention will become apparent from the following description of one embodiment of the same, which embodiment is illustrated in the accompanying drawings, in which:

FIGURE 2 is a perspective view showing the upper end of an aircraft ejection seat; and FIGURE 3 is a diagrammatical view illustrating various stages in the ejection of an aircraft ejection seat from an aircraft and the successive deployment of the parachutes.

Figure 1:
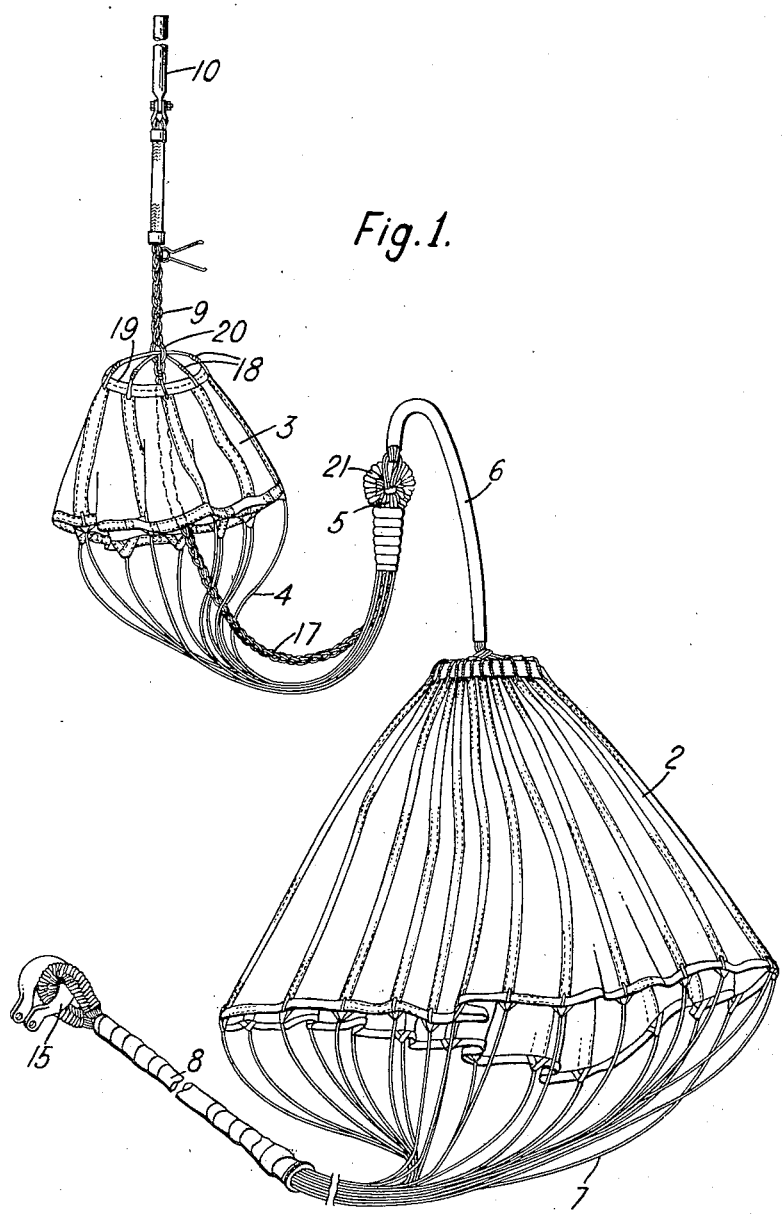
FIGURE 1 is a perspective view illustrating this invention embodied in a parachute system of the kind referred to and suitable for use with an aircraft ejection seat in the manner described in the said Patent No. 2,762,588.

Referring to the drawings and in particular FIGURE 3 it will be seen that the parachute system there illustrated comprises three parachutes interconnected together in a line in series, these parachutes being a personal parachute 1, a drogue parachute 2 and a controller parachute 3. The shroud lines 4 of the controller parachute 3 are securely fastened at their base or connected ends 5 to one end of a drawline 6 securely fastened to the crown of the drogue parachute 2, the base or connected ends of the shroud lines 7 of which are connected by a drawline 8 to the crown of the personal parachute 1.

The crown of the controller parachute 3 is connected to one end of a drawline 9, the other end of which is connected to a deploying member 10 in the form of a projectile normally housed in a drogue gun 11 of known form fixed to one side of an aircraft ejection seat 12.

In normal conditions the personal parachute 1 is stowed in the airman's parachute pack 13, whilst the drogue parachute 2 is stowed in a container 14 at the upper end of the ejection seat, the drawline 8 connecting the drogue parachute to the personal parachute being connected intermediate its ends to a stirrup 15 held by a scissor shackle 16 (as described in Patent No. 2,708,083) to the top of the seat until automatically released at an appropriate moment after the ejection of the seat from its aircraft.

The controller parachute 3 is also initially stowed in the container 14 and is the first of the parachutes to be deployed.

An anti-squid line 17 is provided between that end of the drawline 9 that is connected to the crown of the controller parachute 3 and the connected base ends 5 of the shroud lines 4 of the parachute 3, the said anti-squid line being of such a length and tensile strength as to permit the full deployment of the controller parachute 3 but to prevent any substantial elongation or squidding of the same, such line serving to transmit to the said connected ends of the shroud lines 4 of the controller parachute or to the further line 6 or the part or loop 21 securely attached to such ends, the tension applied by the deploying member 10 to the drawline of the controller parachute and to relieve the canopy of the controller parachute of such tension.

The drawline 9 and the anti-squid line 17 are combined into a single line being integrally formed preferably from interwoven or plaited strands of light-weight high tensile strength material such as nylon, as shown. Alternatively the combined drawline may be formed from any other appropriate flexible strands or material having the requisite light-weight and high tensile strength.

The anti-squid line 17 and the drawline 9 are attached to the controller parachute 3 by passing the cross-lines 18 bridging the usual opening 19 in the top of the canopy of the controller parachute 3 through a loop 20 formed at the junction of the drawline 9 and the anti-squid line 17.

The end of the anti-squid line 17 remote from the drawline 9 has its strands securely wound around and bound to the base loop 21 at the connected or base ends 5 of the shroud lines 4 of the controller parachute, the anti-squid line 17 thus being quite unable to move in the direction of its length independently of said loop or the connected ends of the shroud lines 4 of the controller parachute.

Although the drawline 8 connecting the drogue parachute 2 to the personal parachute 1 has been briefly referred to above as if it were in one continuous length, it will generally be formed in two parts, one part extending from the drogue parachute to the stirrup 15 and a further part extending from the latter to the crown of the personal parachute 1.

On the airman taking appropriate action in the known manner to eject the seat 12 from the aircraft and after the seat has left the aircraft, the drogue gun 11 will be fired automatically in known manner and the deployment member 10 forcibly projected into the air stream surrounding the ejection seat. The projection of the member 10 will automatically withdraw the controller parachute 3 from its container but, because of the presence of the anti-squid line 17, the controller parachute will not be elongated or caused to squid but will be fully deployed in the speediest manner, thus becoming fully effective without delay and, through the further drawline 6, initiating the adequately controlled withdrawal of the succeeding drogue parachute 2. The full deployment of this parachute will at first be temporarily retarded or delayed so as to avoid explosive opening and bursting thereof due to the elongation or squidding of the parachute as a result of the action of the drawline 6 upon the crown thereof. After this temporary delay the drogue parachute 2 will become fully deployed and function to deflect the ejection seat 12 into the line of flight or direction of the air stream as indicated diagrammatically in FIGURE 3, before the automatic release of the drawline 8 from the scissor shackle 16 takes place and permits the withdrawal, by the drogue parachute 2, of the personal parachute 1.

It will readily be appreciated that the provision of the anti-squid line 17 in the controller parachute permits this to be deployed very rapidly without elongation or squidding and that the tension applied by the deploying member 10 to the drawline 9 is transmitted directly to the crown of the drogue parachute 2 through the anti-squid line 17 and the drawline 6 without elongating or squidding the controller parachute.

Thus the function of the anti-squid line 17 is to achieve a state of affairs in the controller parachute which is the opposite to that obtaining in the subsequent parachutes 2 and 1 of the series of parachutes, namely the substantial instantaneous non-squidding deployment of the controller parachute on the one hand and the temporary retardation or delay (as a result of the initial squidding) of the full deployment of the other parachutes of the series.

Although the invention has been described in particular with reference to an ejection seat for high speed aircraft, it should be understood that it could be applied to the jettisoning or discarding of a pod cabin or other part from an aircraft or other body or, for example, to the discarding from a rocket or other ballistic missile of recording or other instruments or scientific apparatus, objects or bodies which it is desired should be safely returned to the earth's crust in a well regulated manner.

I claim:

1. The combination of an aircraft ejection seat adapted to be forcibly ejected from an aircraft in an emergency and including a main parachute having a crown and adapted to be connected to an occupant of the seat, a drogue parachute connected in series with the main parachute and adapted to be disposed above the latter in operation, and a controller parachute having a crown, shroud lines in said controller parachute, said shroud lines being connected together at their lower ends, means connecting the lower ends of said shroud lines to said drogue parachute, and the latter parachute to the crown of the main parachute so that said parachutes are disposed in series, an explosively projectible deploying member, and a drawline having two ends, one of the drawline ends being connected to the deploying member and the other drawline end being connected to the crown of the controller parachute; with an anti-squid line positioned within the controller parachute and securely connecting the crown of the controller parachute to the connected ends of the shroud lines whereby tension imparted to said drawline by said deploying member upon the projection of the latter is transmitted to the anti-squid line.

2. A parachute apparatus, comprising a deploying member of substantially fixed shape; a controller parachute including a crown, a plurality of shroud lines, each of said lines having a terminal portion secured to a peripheral portion of said crown, and the other terminal portions of said shroud lines being secured to each other, and an anti-squid line having respective ends fastened to said other terminal portions and to a central portion of said crown; a draw line having respective end portions fastened to said deploying member and to said central crown portion; another parachute having a crown; and connecting means secured to said other terminal portions and to the crown of said other parachute.

3. An apparatus as set forth in claim 2, further comprising shroud lines secured to a circumferential portion of the crown of said other parachute, said shroud lines of the other parachute having free ends remote from said circumferential portion thereof; a third parachute having a crown; and a connecting member secured to said free ends and to the crown of said third parachute, said connecting member and the shroud lines of said other parachute constituting the sole connection between the crown of said other parachute and said third parachute.

4. An apparatus as set forth in claim 3, further comprising an aircraft ejection seat suspended from said third parachute.

5. An apparatus as set forth in claim 2, wherein said draw line and said anti-squid line are integral.

References Cited in the file of this patent

UNITED STATES PATENTS

| | | |
|---|---|---|
| 396,229 | Pagan | Jan. 15, 1889 |
| 843,946 | Howald | Feb. 12, 1907 |
| 1,186,230 | Riches | June 6, 1916 |
| 1,340,259 | Taylor | May 18, 1920 |
| 1,353,130 | Ruff | Sept. 14, 1920 |
| 2,702,679 | Culver | Feb. 22, 1955 |
| 2,762,588 | Martin | Sept. 11, 1956 |